March 7, 1961 H. KLEMPERER 2,974,317
MOVING TARGET RADAR SYSTEM
Filed Jan. 10, 1948 2 Sheets-Sheet 1
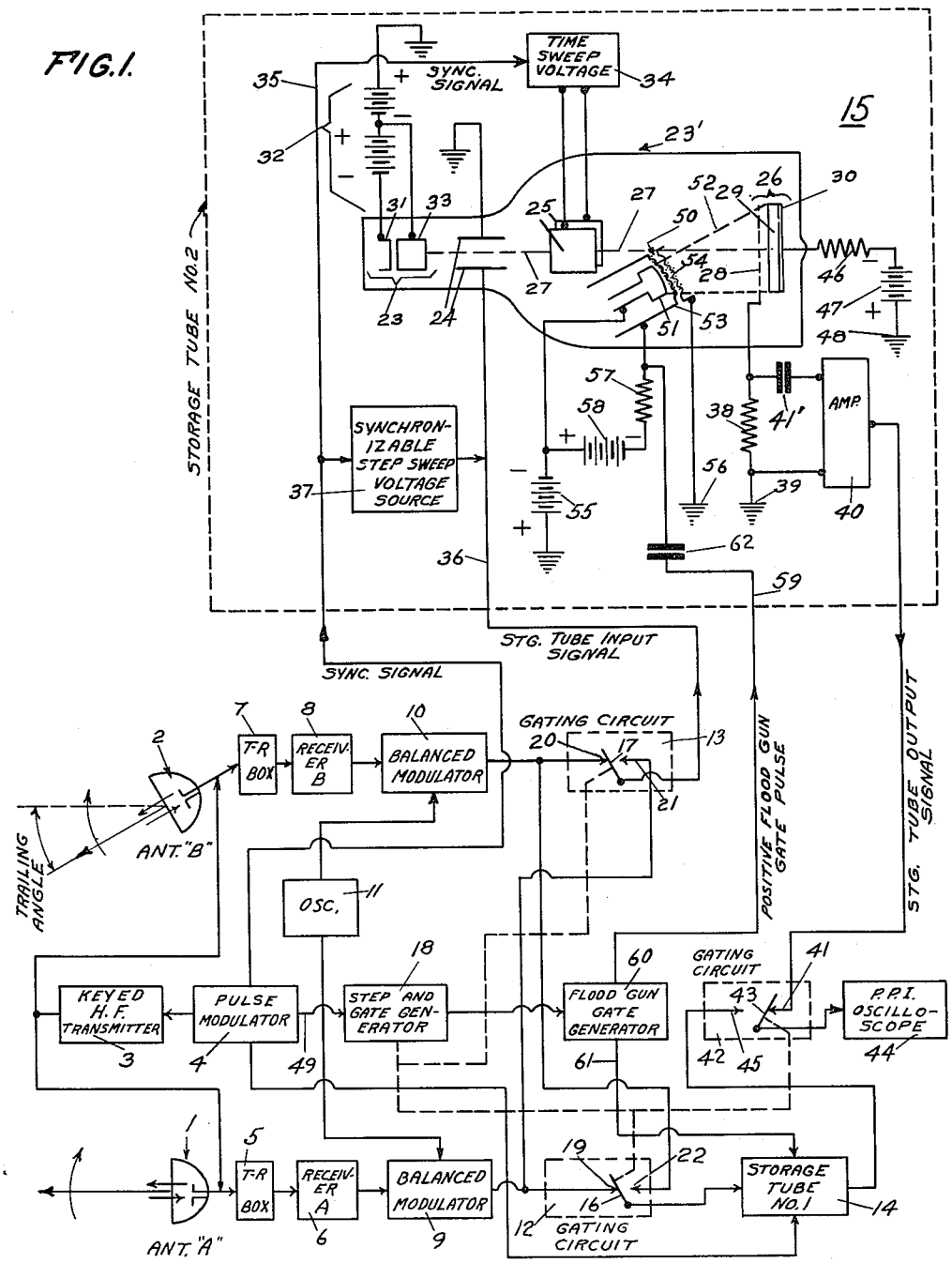
INVENTOR
HANS KLEMPERER
BY
ATTORNEY

FIG. 2

SCHEDULE OF OPERATION OF STEP AND GATE GENERATOR, GATING CIRCUITS, AND FLOOD GUN GATE GENERATOR

TIME →

| | OPERATION No.1 (POSITION ILLUSTRATED) | SWITCH OPERATION | OPERATION No. 2 | SWITCH OPERATION | OPERATION No.3 (POSITION ILLUSTRATED) | SWITCH OPERATION | OPERATION No. 4 | SWITCH OPERATION | ETC. |
|---|---|---|---|---|---|---|---|---|---|
| STORAGE TUBE No.1 | WRITE BY ANTENNA "A" | | COMPARE BY ANTENNA "B" | WIPE OFF | WRITE BY ANTENNA "A" | | COMPARE BY ANTENNA "B" | WIPE OFF | ETC. |
| STORAGE TUBE No.2 | COMPARE BY ANTENNA "B" | WIPE OFF | WRITE BY ANTENNA "A" | | COMPARE BY ANTENNA "B" | WIPE OFF | WRITE BY ANTENNA "A" | | ETC. |
| PPI OSCIL- LOSCOPE GATE | CONNECTED TO TUBE No.2 | | CONNECTED TO TUBE No.1 | | CONNECTED TO TUBE No.2 | | CONNECTED TO TUBE No.1 | | |

INVENTOR
HANS KLEMPERER
BY
*Elmer J. Gorn*
ATTORNEY

United States Patent Office 2,974,317
Patented Mar. 7, 1961

2,974,317

MOVING TARGET RADAR SYSTEM

Hans Klemperer, Belmont, Mass., assignor to Raytheon Company, a corporation of Delaware Filed Jan. 10, 1948, Ser. No. 1,638

20 Claims. (Cl. 343—7.7)

This invention relates to radar systems, and more particularly to a moving target indicator (MTI) system which utilizes two electron discharge devices of the type known as storage tubes.

The present invention is particularly useful for very long range (VLR) early warning radar equipment, and in such VLR equipment it is very desirable to be able to distinguish between fixed and moving targets detected by such equipment, since the latter type of targets is all that the observer is ordinarily interested in. For MTI applications, storage tubes have been found very useful; in these tubes, an electron beam is used to place a charge on a non-conducting electrode disposed therein. For each transmitted radar pulse, a received radar echo signal is stored in the form of an electrical charge distribution on the surface of the said non-conducting electrode or storage plate. In MTI applications, an individual complete trace over the storage surface (one recording) is ordinarily compared with the next succeeding trace, and an output is produced when these two compared traces do not coincide exactly with each other. If there are no moving targets, but only stationary targets, assuming a so-called Type A data presentation, the "pips" produced in each trace as it is swept across the storage surface remain constant in amplitude and in time spacing with respect to the transmitted pulses from one trace to the next. However, if moving targets are present, the pips representative of such targets may vary both in time spacing with respect to the transmitted pulses and also in amplitude from one trace to the next. In most practical systems the time spacing variation is quite small while the amplitude variation is quite large, but in any event the change at any one spot on the storage surface from one trace to the next is manifested as a variation in the value or amplitude of the potential at that spot. Thus, it is most convenient to consider the variations which the moving targets introduce on the storage surface as amplitude variations. Therefore, indications of moving targets depend mainly on variations in the amplitude of the pips from one trace to the next. As a result, to maintain a clear distinction between fixed and moving targets, or to insure that moving target indications will not result from the presence of fixed targets, it is essential that fixed targets produce no variations in amplitude of the pips from one trace to the next. Such variations in amplitude may be termed "amplitude modulation" of successive traces.

In prior systems of the VLR type, amplitude modulation of successive traces is produced by fixed targets, which is very undesirable; why this is so may be seen from the following discussion. A typical VLR system may have a directional antenna whose beam width is between two degrees and three degrees, from which antenna radar pulses may be transmitted at a repetition rate of 300 pulses per second, which would allow for a range of 300 miles. Now assuming this antenna is being rotated at 15 r.p.m., which is a not unreasonable scanning speed, with a beam width of three degrees there would be transmitted only 10 pulses per beam width, since the antenna rotates at 90 degrees per second and would travel through three degrees in 1/30 second.

Now considering a directional antenna, if the beam pattern of such an antenna is plotted in rectangular coordinates with the angle of radiation as abscissa and the radiation intensity as ordinate, a non-rectangular or peaked curve will result, in which the ordinates vary with the abscissae. This pattern may now be moved horizontally along a time axis with respect to a fixed point in order to represent the rotation of the antenna with respect to a fixed target. Because of the fact that, under the conditions stated, there are only ten pulses transmitted per beam width or during the time that the entire beam pattern passes a predetermined point, successive pulses are rather widely spaced along the beam pattern curve. Therefore, successive pulses transmitted toward the same fixed target are transmitted and received with substantially different radiation intensities due to unequal ordinates of the antenna beam pattern, giving amplitude modulation of successive traces on the storage tube for fixed targets and obscuring the distinction between fixed and moving targets.

One possible solution of the above-described difficulty might be to change the antenna beam pattern to a rectangular one, or one in which the ordinates are all equal or do not vary with the abscissae, since in this case successive pulses would be transmitted and received with exactly the same radiation intensities toward the same fixed target, no matter what the time interval between successive pulses, providing of course that the time interval between pulses is somewhat less than the time taken for the antenna pattern to pass any particular target, so that more than one pulse would impinge on said target. However, it has been found that such a rectangular antenna beam pattern cannot be obtained physically and in practice, if the required directional characteristic of the antenna is to be maintained.

Another possible solution might be to increase the repetition rate of the transmitted pulses to a point such that they would be so closely spaced with respect to the antenna pattern that the difference in radiation intensities between two successive transmitted pulses would be negligible; under these conditions, there would be negligible amplitude modulation of successive traces by fixed targets. However, if the pulse repetition rate were increased to this extent, the effective range of the equipment would be drastically reduced, which cannot be done if the equipment is to be VLR: for this reason, the repetition rate of the equipment cannot be increased beyond a certain maximum, such as 300 pulses per second in the example given.

A still further possibility is to materially reduce the speed of rotation of the directional antenna, so that the antenna beam pattern moves slowly enough with respect to fixed targets so that successive pulses are transmitted during only negligible relative displacements of the pattern with respect to the target, thereby giving only negligible differences in radiation intensities or amplitudes between successive pulses. However, if this is done, there is too great a sensitivity to ground clutter variations and to very slow moving targets.

Therefore, an object of the present invention is to substantially eliminate amplitude modulation of successive traces in a VLR MTI equipment due to fixed targets, in a practical way and without reducing the range of the equipment.

Another object is to accomplish the aforesaid object by means of a system which is suited for high speed antenna rotation and consequent desirable high scanning rate of the area being searched.

The foregoing and other objects of the present invention will be best understood from the following description of an exemplification thereof, reference being had to the accompanying drawings, wherein:

Fig. 1 is a diagrammatic representation of a system embodying the present invention; and Fig. 2 is a schedule, in tabular form, of the operation of the system of Fig. 1.

Generally, the system of the present invention utilizes two directional antennas rotating at the same speed and radiating two separate beams of pulses, a "recording" beam from a first antenna and a "comparing" beam from a second antenna. Both beams are identical in power level and distribution pattern. The second antenna trails behind the first antenna by a certain predetermined angle which, taking into consideration the common pulse repetition rate and the speed of rotation of the antennas, corresponds to an integral number of transmitted pulses or to an integral number of sweeps of the electron beam across the storage surfaces of the storage tubes which are used. Two separate storage tubes are used, and intelligence from the two separate receivers is supplied alternately to these two tubes through synchronized gates. A third gate in synchronism with the other two alternately connects the two storage tubes to an indicator tube. The signals from the first channel receiver and from the second channel receiver are alternately written on the storage tubes in such a manner that each sweep is a separate line, the number of lines on each tube being equal to the predetermined number of sweeps which corresponds to the antenna trailing angle.

When all the said predetermined number of sweeps have been recorded on storage tube one by the first receiver, said receiver is gated to storage tube two to continue the record by recording the same number of sweeps; while the first receiver is recording on storage tube two, the second channel is gated to storage tube one to sweep across the same lines of stored intelligence in the same manner as the first channel did before. This operation by the second channel is the comparing operation and while comparison is going on, storage tube one is connected to the indicator tube to transfer intelligence of moving targets thereto. For fixed targets, the story of the traces repeats exactly and all signals are cancelled. If a trace does not repeat exactly, the target is moving and is reported as such.

When comparison on storage tube one is finished, recording on storage tube two is finished, and by means of the gating circuits, the first receiver is switched back to storage tube one to start new records while the second receiver is comparing storage tube two which now is gated to the indicator tube. Thus, the second or comparing channel always has a direct path through a pre-impressed or prerecorded storage tube to the indicator tube, while the first or recording channel always ends on a storage tube without further connection. It follows that the appearance of intelligence on the indicator tube is synchronized with the second antenna, which trails behind the first antenna by a time corresponding to the predetermined displacement or trailing angle.

Now referring to the drawings, and particularly to Fig. 1 thereof, two directional antennas 1 and 2 are rotated at a suitable optimum speed, such as 60 r.p.m. for example, by any suitable means, now shown. These antennas are rotated at the same speed, and may therefore conveniently and preferably be mounted on a common shaft. The antennas rotate in the clockwise direction indicated by the arrows. The two antennas are of identical construction and identical electrical characteristics, so that they have identical beam patterns. Antenna 1, labeled "antenna A," is the "recording" antenna, and antenna 2, labeled "antenna B," is the "comparing" antenna. Antenna 2 is displaced angularly with respect to antenna 1 in a direction opposite to the direction of rotation by a predetermined small angle, labeled "trailing angle" in the drawing, so that as the antennas rotate, the beam pattern of antenna 2 trails or lags behind that of antenna 1, with respect to targets, by the said constant predetermined trailing angle. This trailing angle, which will be further referred to hereinafter, may be on the order of five degrees, for example; the angle has been exaggerated in Fig. 1 for purposes of clarity.

The two antennas 1 and 2 are fed or supplied with energy from a common keyed high frequency transmitter 3, such as a magnetron, which is keyed on and off at a certain predetermined repetition rate, on the order of 300 times per second for example, by a pulse modulator 4. The "on" time of transmitter 3, or the pulse duration, may be on the order of four microseconds, for example, which means that the interval between successive pulses is long compared to the length or duration of each pulse. Antennas 1 and 2 therefore transmit synchronized trains or series of spaced repetitive pulses, each train being transmitted directionally by a corresponding antenna and the two beams of pulses being angularly displaced from each other by the predetermined trailing angle. Since the two antennas have identical electrical characteristics and are supplied from a common source 3, the two beams have identical power levels.

Antennas 1 and 2 are intended to be used both for transmission and reception, with the signals received by each antenna being fed into a separate channel. In order to prevent the transmitted pulses from affecting the receiver channels and to prevent the received pulses from being diverted away from the receiver channels, a conventional so-called T-R box 5 is connected between antenna 1 and channel A receiver amplifier 6, a similar T-R box 7 being connected between antenna 2 and channel B receiver amplifier 8. Receivers 6 and 8 are made exactly alike in all respects.

The amplified signals from amplifier 6 are supplied to a balanced modulator 9, the amplified signals from amplifier 8 being supplied to a similar balanced modulator 10. Modulators 9 and 10 are exactly alike. A so-called coherent oscillator 11 supplies energy to both modulators 9 and 10 in order to mix such energy with the signals in the two channels and to convert such signals to varying direct voltages.

The varying direct voltage output of modulator 9 is applied to a pair of controllable gating circuits 12 and 13 by means of which such voltage may be applied alternately to two storage tubes 14 and 15. For purposes of simplicity, gating circiuts 12 and 13 are diagrammatically shown as each consisting of a movable switch contact which cooperates with a pair of stationary switch contacts. The two gating circuits are intended to be synchronized or to operate simultaneously with each other under the control of a common operating means, and for this purpose movable contact 16 of circuit 12 is illustrated as mechanically connected to movable contact 17 of circuit 13, both such contacts being controlled from a step and gate generator 18 to be described later. One particular operating position of circuits 12 and 13 is as shown, with contact 16 on fixed contact 19 of circuit 12 and with contact 17 on fixed contact 20 of circuit 13.

A connection extends from contact 16 to storage tube 14, so that the signal applied to said contact provides the input signal to said storage tube. Similarly, a connection extends from contact 17 to storage tube 15, so that the signal applied to said contact provides the input signal to said storage tube.

The output of modulator 9 is connected to fixed contact 19 of circuit 12 and to fixed contact 21 of circuit 13, so that in the operating position of the gating circuits illustrated, the varying direct voltage output of said modulator is applied to storage tube 14 as the input signal therefor due to closed contact 19, and said output is not effective on storage tube 15 due to the open circuit at contact 21 of gating circuit 13.

The varying voltage output of modulator 10 is applied to gating circuits 12 and 13 in order to connect such output alternately to the storage tubes 14 and 15. For this purpose, the output of modulator 10 is connected to fixed contact 20 of circuit 13 and to fixed contact 22 of circuit 12. In the operating position of gating circuits illustrated, the varying direct voltage output of modulator 10 is applied to storage tube 15 as the input signal therefor due to closed contact 20, and said output is not effective on storage tube 14 due to the open circuit at contact 22 of gating circuit 12.

When gating circuits 12 and 13 are operated or actuated by step and gate generator 18 to in effect close contacts 16 on 22 and 17 on 21 and to break contacts 16 from 19 and 17 from 20, modulator 9 is disconnected from storage tube 14 and is connected to storage tube 15, while modulator 10 is disconnected from storage tube 15 and is connected to storage tube 14. It is desired to be made clear that, although gating circuits 12 and 13 are shown as switches, this has been done only for purposes of simplicity. Preferably, such circuits are electronic gating circuits which are controlled by voltage impulses supplied from gate generator 18. However, it is possible to ultilize for such circuits mechanically-actuated switches the operation of which is properly synchronized with the pulses produced by pulse modulator 4 in a manner to be described.

Storage tube circuit 15 includes, as the main element thereof, a storage tube 23, preferably substantially of the type disclosed in my copending application, Serial No. 787,873, filed November 25, 1947, now U.S. Patent No. 2,715,183, granted August 9, 1955. Such a tube as that in my copending application has mounted inside a suitable envelope 23' an electron gun 23, a pair of horizontal deflecting plates 24, a pair of vertical deflecting plates 25, and a storage plate structure 26; the gun 23 is mounted at the narrow end of the tube envelope and is adapted to project a stream of electrons 27, between the two plates of pair 24 and between the two plates of pair 25, toward and to the storage plate structure 26 which is mounted at the enlarged end of the tube envelope. Structure 26 consists of a foraminous metallic electrode 28, a slab 29 of non-conducting or insulating material such as glass, and a metallic coating 30. Screen 28 is on the electron gun side of slab 29 and is spaced slightly therefrom, while conductive coating 30 covers and directly contacts the back side of slab 29. Electron stream 27 passes through screen 28 to impinge on slab 29. The elements of structure 26 are mounted in the envelope and spaced from each other in the manner disclosed in my aforesaid copending application.

Cathode 31 of electron gun 23 is connected to the negative end of a suitable source 32 of direct voltage, for example a battery, the positive end of which is connected to ground, so that the said cathode has a high negative potential with respect to ground. The potential of battery 32 is quite high, on the order of 1600 volts, for example. Cathode 31, it will be understood, produces the necessary electron population when suitably energized.

Accelerating anode 33 of the electron gun is connected to an intermediate point on battery 32 to provide the necessary bias therein. In Fig. 1, for purposes of simplicity, the necessary focusing and control included in gun 23 are not shown nor are their potiential sources; however, it is to be understood that such electrodes are included in gun 23 in a manner familiar to those versed in the art pertaining to this type of electron discharge device. Although in Fig. 1 several sources of potential are shown in the form of batteries, the usual practice is to provide these potentials from a source of suitably-rectified alternating current.

Connected between the vertical deflecting plates 25 is a synchronizable source of time sweep voltage 34. The circuit for generating said sweep voltage may be any of the many well-known circuits and is indicated on the drawing in block form to simplify the illustration. The electron beam is deflected horizontally by the voltage supplied from source 34. Sweep voltage source 34 is synchronized from the pulse modulator 4 by a connection 35, in order to trigger said source to begin a sweep of the electron stream across storage plate 29 at the time of each pulse transmitted from transmitter 3 and the antennas.

Horizontal deflecting plates 24 are arranged to deflect the electron beam 27 in a vertical direction. These plates are connected by a connection 36 to receive the storage tube input signal applied to the movable contact 17 of gating circuit 13, one of the plates 24 being grounded and the other connected to connected to 36. The output of receiver modulators 9 or 10 is a series of unidirectional pulses corresponding to those reflected from reflecting objects or targets in space within the field of search of the radar equipment.

The above-recited connections to the electron gun and to the two pairs of deflecting plates are like those utilized in a so-called Type A radar indicator, in which the echo pulses cause upward deflections to occur along the substantially horizontal sweep trace on storage surface 29 at distances from a reference point proportional to the range of the target, the height of such deflections corresponding to the received signal intensity.

The predetermined trailing angle previously referred to, which is the angle of lag of directional antenna 2 with respect to antenna 1 or the constant angle between the center of the beam of antenna 2 and the center of the beam of antenna 1 at any instant, is made such that the beam of antenna 2 trails behind the beam of antenna 1 by an angle which corresponds to an integral number of transmitted pulses (or an integral number of sweeps of the electron beam across the storage plates of the storage tubes 14 and 15, since one such sweep occurs for each transmitted pulses). This number of sweeps per trailing angle can be made an integer by properly establishing the speed of rotation of the antennas and the periodicity or repetition rate of pulse modulator or keyer 4. This predetermined integral number of sweeps per trailing angle is used to correlate several parts of the system.

The connection 35 from pulse modulator 4, in which connection appear pulses which coincide in time with the pulses transmitted from antennas 1 and 2, is utilized to control or synchronize a step sweep voltage source 37, the output of which is applied to connection 36 and thereby also to the horizontal deflecting plates 24. Source 37 produces a direct voltage in its output which varies in step-like fashion, a shift from one step to the next being accomplished or triggered by each controlling pulse applied to the input of said source from pulse modulator 4. This source is designed to produce a predetermined number of "steps" in its output wave; after this predetermined number, the output voltage of said source goes back to zero or to its original value. The circuit constants of source 37 are so designed that this predetermined number is made equal to the aforesaid predetermined number of sweeps per trailing angle already established. By the addition of this stepped voltage to the vertical electron beam deflection circuit, the beam is caused to trace out on the storage surface 29 a plurality of spaced substantially horizontal parallel traces, because the stepped voltage, at the beginning of each trace, causes a vertical deflection of the trace which vertical deflection is constant, is peculiar to that particular trace, and is maintained throughout that particular trace.

By the above-described operation of the sweep circuits of storage tube 15 or 23, a plurality of sweeps or traces are written on the storage surface 29 in such a manner that each trace or sweep is recorded as a separate line, the number of lines on such surface corresponding to the predetermined number of sweeps per trailing angle, each trace having vertical pips therein corresponding to echoes received during such trace. In other words, a plurality of A-scope traces are produced on the storage plate, these traces being displaced vertically from each other and being substantially parallel to each other.

Storage tube 14 is exactly the same as storage tube 15 in every detail and is similarly connected to the remainder of the system; the circuits of tube 14 have not been shown in detail, in order to avoid unnecessary duplication. Storage tube 14 therefore also has a plurality of sweep traces written thereon, the number of traces corresponding to the predetermined number of sweeps per trailing angle. In the operating position (of gating circuits 12 and 13) shown, the electron beam of storage tube 15 is sweeping across the storage plate of said tube in accordance with the signals being received by antenna 2, while the electron beam of storage tube 14 is sweeping across the storage plate of said tube in accordance with the signals being received by antenna 1. The electron beams of the storage tubes are swept across the storage surfaces of such tubes in a plurality of substantially parallel traces and the radar receiver signal of each channel is applied to the corresponding storage tubes in such a manner as to deflect the beam in a direction perpendicular to the direction of time-sweep of each such trace.

Screen or grid 28 is connected through a resistor 38 to ground at 39, so that said screen is at ground potential. Opposite ends of load or output resistor 38 are connected to provide the input to an output amplifier 40, a direct current blocking condenser 41' being provided in series in one of the leads to amplifier 40.

The amplified output of amplifier 40 is applied to one of the fixed contacts of a gating circuit 42 which is similar to circuits 12 and 13 and the movable contact 43 of which is operated synchronously and simultaneously with contacts 16 and 17 from step and gate generator 18, as indicated by the illustrated mechanical connection from generator 18 to movable contact 43. The movable contact 43 of circuit 42 is connected to a suitable oscilloscope 44, so that the voltage applied to said movable contact serves as the input signal to said oscilloscope. In the operating position of circuit 42 illustrated, the output of storage tube output amplifier 40 is applied to said oscilloscope 44.

Storage tube 14 has an output amplifier similar to amplifier 40, the output amplifier of tube 14 being connected to the storage tube itself in a manner exactly similar to the way amplifier 40 is connected to tube 15. The output of the output amplifier for storage tube 14 is applied or connected to the second fixed contact 45 of gating circuit 42. When the gating circuit 42 is operated or actuated to in effect close contact 43 on 45 and to open contact 43 from 41, the output of storage tube 15 will be disconnected from oscilloscope 44 and the output of storage tube 14 will be connected or applied to said oscilloscope.

The repeller electrode or metallic electrode 30, which is in intimate contact with the storage plate 29 made of insulating material, is connected through a high resistance 46, on the order of one megohm for example, to the negative side of a direct voltage source 47, the positive side of which is grounded at 48. The potential of battery 47 is preferably on the order of 500 to 1000 volts. By this connection, the repeller 30 and thereby the whole storage plate 29 are raised to a high negative potential with respect to ground.

In accordance with the action described and disclosed in my aforesaid application, the traces on storage surface 29, or the lines of points bombarded by electron beam 27, will reach an equilibrium condition or will be brought to a potential level which is slightly positive with respect to the potential of the electrode 28, so that the potential of each trace changes from the original unbombarded 1000 volts negative with respect to ground to a few volts positive with respect to ground. The beam traces will therefore produce lines on surface 29 along which the potential is uniform and predetermined, said potential being greatly different from the potential of those areas not bombarded by the electron beam because the areas not so bombarded remain at the negative 1000 volts potential (with respect to ground) applied to storage surface 29 by means of repeller 30 and battery 47.

As explained in my aforesaid application, screen 28 may be used as a signal pickup electrode, and the sign of the collector 28 output signal voltage, produced only when the scanning electron beam encounters an area on the storage plate which is still at the high negative potential applied thereto by battery 47 and only when the said beam brings such areas to a potential level slightly positive with respect to ground, is positive.

A completed beam trace produces a line on storage surface 29 of uniform predetermined potential. During the original tracing or recording of such trace, an output voltage may be produced on the electrode 28, if the previous trace has died out or has been obliterated. When an electron beam under the control of a succeeding echo signal is swept over the storage plate for purposes of comparison with the preceding trace or echo signal, a succeeding trace which exactly duplicates the preceding trace produces no output voltage across resistor 38 during said succeeding trace, since the beam finds an equilibrium potential or a predetermined small positive potential level at each and every point in the trace. Any deviation in the succeeding or comparison trace from the path covered in the preceding or recording trace will result in a change of potential of the storage surface, in such deviation areas, from the biasing or unbombarded potential to the predetermined small positive potential level, thus producing for such deviation areas an output or signal voltage across resistor 38, since, in such a deviation, the electron beam will encounter areas on the storage surface which are still at the negative biasing potential and are not at the small positive predetermined equilibrium potential. For such deviation areas, there will be a net dielectric displacement, producing a voltage change across resistor 38.

It is desired to be made clear that storage tube 14 is exactly similar, in all respects, to storage tube 15, and operates in a similar manner, so that an output voltage is produced by tube 14 when and only when a subsequent or comparing trace is not exactly similar to a previous writing or recording trace.

In radar systems, as previously discussed, the pips representing so-called "ground clutter" or echoes from fixed targets are exactly similar at all times for any certain target, so that the subsequent or comparing trace for any particular fixed target or particular series of fixed targets is exactly the same or repeats the same pattern as the preceding or writing trace for the same fixed target or series of fixed targets. The pips representing echoes from moving targets, on the other hand, fluctuate in amplitude in the comparing trace relative to the recording trace. If only ground clutter is being received, the comparing and writing traces will have exactly the same pattern for any certain fixed target, and no output will be produced from the storage tube. However, if moving targets are present in the field of search of the radar equipment, the comparing beam trace will deviate from the corresponding recording beam trace, and output signals will be produced from the storage tube indicative of such deviations.

The step and gate generator circuit 18 is connected as at 49 to receive impulses from pulse modulator 4 at the predetermined periodicity or pulse repetition rate of said pulse modulator. Circuit 18 functions in effect as a counting circuit, to produce an output signal or voltage pulse in response to a certain predetermined number of input pulses, the said output signal being applied as indicted to gating circuits 12, 13 and 42 to actuate said circuits from one position to the opposite by each of the output pulses of circuit 18. In other words, after a certain predetermined counted number of input pulses, circuit 18 functions to produce an output pulse which operates or actuates each of the gating circuits 12, 13 and 42 to switch all of them from their positions illustrated to their opposite positions (that is, closing 16 on 22, 17 on 21, and 43 on 45); after the same predetermined number of input pulses, circuit 18 again functions to produce an output pulse which operates each of the gating circuits back to the position illustrated. The circuit constants of circuit 18 are made such that the predetermined number of input pulses counted by said circuit, and for which number said circuit produces an output signal or pulse, is equal to the predetermined integral number of sweeps corresponding to the trailing angle of antenna 2.

Intelligence from the two antennas 1 and 2, or from the two modulators 9 and 10, is supplied alternately to the storage tubes 14 and 15 through the synchronized gating circuits 12 and 13, the third gating circuit 42 in synchronism with the other two connecting the two storage tubes alternately to the indicator tube 44. With the particular operating position of the gating circuits 12, 13 and 42 illustrated, antenna A, which leads antenna B, is connected to storage tube 14 to cause the electron beam of said tube to write on the storage surface of said tube a plurality of spaced substantially parallel traces each under the control of the echo signals being received by said antenna, in the manner aforesaid. As previously described, each sweep or each trace is recorded as a separate line, the number of lines or traces on the storage surface of tube 14 being equal to or corresponding to the number of sweeps per trailing angle, due to the operation of the vertical deflection circuit of the storage tube. The output of storage tube 14 is not applied to oscilloscope 44 during this time because of the open circuit at contact 45. Thus, the recording channel A ends on the storage tube 14 without further connection.

During this time, lagging antenna B is connected to storage tube 15 to compare the traces previously written thereon. This operation of comparing channel B will become clearer subsequently. Also, during this time, the output of storage tube 15 is connected to oscilloscope 44 through contact 41. Therefore, the comparing channel B has a direct path, during this time, through a preimpressed or prerecorded storage tube 15 to the PPI oscilloscope 44.

We will consider the operation of the system from the time instant at which the gating circuits have been actuated to the position illustrated. The signals from recording channel A are recorded on the storage tube 14 during this first period as a plurality of separate sweep traces, as described above; during this time comparing channel B has a path through storage tube 15 to the oscilloscope or indicator tube 44.

When the predetermined integral number of sweeps per antenna trailing angle has been recorded on storage tube 14, the gate generator 18 transmits an output pulse to the gating circuits to close 16 on 22, 17 on 21, and 43 on 45; at the same time, the step sweep voltage source 37 and its counterpart for storage tube 14 operate as above described to return the electron beams of the corresponding storage tubes to their original positions in order to begin a new series of sweeps. For the next period corresponding to the predetermined number of sweeps per trailing angle, recording channel A is connected or gated to storage tube 15 to record thereon the same number of sweeps, comparing channel B is connected or gated to storage tube 14, and storage tube 14 is connected or gated to the PPI 44.

It will be recalled that during this second period the electron beam of storage tube 14 is scanning over the storage surface of said tube, on which surface there has been previously recorded a trace pattern by channel A, under the control of comparing channel B and antenna 2. Since the actuation of the gating circuits occurs at the end of a predetermined number of sweeps corresponding to the antenna trailing angle, the beginning of this second period is at an instant which follows the beginning of the first period by a time corresponding to that required for the antennas to rotate through the trailing angle. Therefore at the beginning of this second period antenna B is at the same position with respect to the field of search of the radar equipment as was antenna A at the beginning of the first period. Therefore, during the second period antenna B scans through exactly the same portion of the field of search as did antenna A during the first period. Since the two antennas are exactly the same in power level and distribution pattern, since the components in channels A and B are exactly alike, and since antenna B is now scanning through exactly the same sector as did antenna A during the previous period, for fixed targets each trace pattern of comparing channel B during this second period will be exactly the same as the similar corresponding pattern of recording channel A during the first period, but for moving targets the two corresponding patterns will deviate somewhat from each other.

The signals received by antenna A during the first period were recorded or written on storage tube 14 during such period. During the second period, while channel A is recording on storage tube 15, channel B is caused, by the operation of the sweep circuits previously described, to sweep across the same lines of stored intelligence on storage tube 14 in exactly the same manner as channel A did during the first period, while it was recording on tube 14.

During this comparing operation and while comparison is going on, storage tube 14 is gated to the PPI oscilloscope 44 to transfer thereto intelligence of moving targets. If the trace pattern of channel B is during this period exactly the same as that of the previously-recorded corresponding channel A pattern, which would be the case with no moving targets, no output is produced from the storage tube 14; why this is so should be apparent from the matter appearing hereinbefore. For moving targets, the trace pattern of channel B will deviate from the previous corresponding trace pattern of channel A, giving an output from storage 14 which will be indicated on the PPI 44.

When the predetermined number of sweeps per trailing angle has been made, the second period is ended, ending comparison by channel B on storage tube 14 and ending recording by channel A on storage tube 15. The gating circuits are now operated, in the same way as at the end of the first period, by circuit 18, to close 16 on 19, 17 on 20, and 43 on 41, and to end the second period and begin the third period. The recording channel A is gated back to storage tube 14 to start new records and to record thereon during the third period, while comparing channel B is gated to storage tube 15 to provide a comparing operation thereon during this period, tube 15 being gated to the indicator tube 44 during this period. The duration or length of this third period, also, is equal to the time required for the predetermined number of sweeps per trailing angle. During this third period, recording channel A records or writes a pattern on storage tube 14 in exactly the same way as it did during the first period, and comparing channel B performs a comparing operation on storage tube 15 in the same manner as it did on storage tube 14 during the immediately preceding period. Since the second period is of a length corresponding to the predetermined number of sweeps per trailing angle, during the third period antenna 2 is traveling through the same sector as antenna 1 did during the second period, so that proper comparison may be made by antenna 2 during this third period.

After the predetermined number of sweeps corresponding to the trailing angle, the gating circuits 12, 13 and 42 are again actuated by generator 18 to switch the channels to the same arrangement as that existing during the second period, that is, channel A writing or recording on storage tube 15, channel B comparing on storage tube 14, and indicator tube 44 connected to the output of the storage tube 14 being compared.

The above-described operation repeats by periods indefinitely as long as the system is energized. From the above, it should be seen that the comparing channel B always has a direct path through a preimpressed storage tube to the PPI indicator 44, while the recording channel A always ends on a storage tube without further connection. Therefore, it follows that the appearance of intelligence on the indicator 44 is synchronized with the antenna 2 which trails behind antenna 1 by a time corresponding to the displacement or trailing angle.

It will be seen from the above that I have accomplished the objects of my invention. Since the beam patterns of the writing antenna 1 and the comparing antenna 2 are exactly the same and since during the comparing operation the comparing antenna is traveling through exactly the same sector as did the writing antenna during the writing operation on the same storage tube and the comparing electron beam is sweeping across the storage tube in the same manner as did the writing beam during the previous writing operation, the pips representative of fixed targets have exactly the same amplitude during the comparing operation as during the writing operation and, due to the fact that the comparing trace pattern on the storage tube is exactly the same for such targets as the previous writing trace beam on the same tube, no output signal is produced for such targets because of the storage tube operation explained above; amplitude changes of the comparing trace with respect to the writing trace are therefore substantially eliminated for such targets. If a particular impulse in the writing electron beam pattern does not repeat exactly in the comparing electron beam pattern, an output signal is produced; such a non-repetitive condition results from the presence of a moving target, and the moving target is therefore reported as such.

The system of the present invention, it will be observed, does not require increase of the periodicity or pulse repetition rate of pulse modulator 4, with its consequent reduction in range of the equipment. Also, the system of the present invention is inherently suited to high speed rotation of the antennas.

It is desired to be pointed out that, with the system of this invention, rather long comparison times are involved, so that it is necessary to in effect delay the signal, with which a later signal is to be compared, for a relatively long period of time. With a trailing angle of five degrees and an antenna rotation speed of 15 r.p.m., the antennas travel through an angle of five degrees in 1/18 sec. or approximately 55,000 microseconds, so that there is comparison of the successive trace patterns on each storage tube approximately every 55,000 microseconds; with an antenna rotation speed of 60 r.p.m. and the same trailing angle, the antennas travel through five degrees in 1/72 second or approximately 14,000 microseconds, so that the comparison time under these conditions is approximately 14,000 microseconds. Both of the above examples of comparison time are rather long times and it is impossible to delay the first signal for times of this order by any other means, such as mercury delay lines, for example. However, with storage tubes such as utilized in the system of my invention, it is entirely feasible and very easy to store a signal for times of this order in order to compare said stored signal with a subsequent signal.

Up to this point, nothing has been said about the interference of traces, previously written and compared on the storage surfaces of the storage tubes, with traces to be subsequently written thereon when the writing antenna is traveling through a different sector than the one through which it was traveling during the previous recording on that same storage tube. By utilizing glass or other insulating material of the proper conductivity and thickness for the storage plates of the storage tubes, the time constant of such storage plates may be set to store the intelligence for the time corresponding to one displacement or trailing angle. By this measure, no interference may normally be expected from the traces left over from the previous operation, which traces had the time of two trailing angles to die out.

However, to entirely eliminate the possibility of appearance of any confusion from interference of this kind, a deleting beam is preferably flashed onto each storage tube surface in synchronism with the gates after each comparing cycle or operation on the corresponding tube. In order to provide this deleting beam, I mount in each of the storage tubes 14 and 15 an electron flood gun structure designated generally by the numeral 50.

Structure 50 consists of an electron-emissive cathode 51 which is capable of projecting a broad beam 52 of electrons through a control grid 53 and a foraminous anode 54 toward and to storage plate 29, the beam 52 being broad enough to impinge upon and to cover the surface of plate 29 on which electron beam 27 impinges. Cathode 51 is connected to the negative end of a suitable source 55 of direct voltage, for example a battery, the positive end of which is connected to ground, so that the flood gun cathode has a negative potential with respect to ground. The voltage of the battery 55 is $V_f$, which is less than the voltage $V_1$ which gives for the material of electron target 29 a secondary emission ratio of unity. The flood gun anode 54 is connected to ground at 56, so that when the flood gun is turned on the entire storage surface 29 will be flooded with an electron beam 52 whose voltage is less than the voltage $V_1$ defined above. The flood gun control grid 53 is connected through a resistor 57 to the negative terminal of a biasing battery 58 the positive terminal of which is connected to cathode 51. The voltage of battery 58 is such that grid 53 is normally biased to cutoff, so that beam 52 is normally off but may be flashed on by applying an impulse of the proper amplitude and polarity to grid 53 by means of a lead 59 connected to said grid. Under the above-described voltage conditions, when the electron flood beam strikes target 29 a negative charge is accumulated over the entire surface of said target, and a condition of equilibrium is finally reached at which the entire surface of target 29 is brought to a common potential. The beam current required to erase the storage surface charge, or to bring the entire surface to a common potential, depends on the length of the flood gun beam pulse, the voltage $V_f$, and the capacitance between the storage surface 29 and the screen 28.

Generator circuit 18, in addition to supplying its output pulses to the gating circuits to actuate them, supplies said output pulses also to a flood gun gate generator 60. Generator 60 produces a positive flood gun gate pulse for each output pulse of generator 18, and supplies successive flood gun gate pulses alternately to connections 59 and 61, which lead to the flood gun control grids of storage tubes 15 and 14, respectively. The positive gate pulse supplied to lead 59 is transmitted through condenser 62 to control grid 53 of flood gun 50, once for every two output pulses of generator 18. The positive gate pulse supplied to lead 61 is transmitted to the flood gun control grid of storage tube 14, once for every two output pulses of generator 18, the pulses transmitted to storage tube 14 intervening between those transmitted to storage tube 15.

It has been explained above that the flood beam 52 provided by flood gun 50 will, when turned on, charge the entire area of the storage surface 29 to a uniform or common potential. As explained previously, the grid 53 is normally biased to cutoff, so that beam 52 is normally off. The positive gate pulse supplied to grid 53 from generator 60 causes the flood electron beam 52 to be flashed on for a length of time equal to the length of said positive gate pulse. Therefore, the entire area of surface 29 is brought to a common predetermined potential by the flashing on of flood beam 52. Since the entire area of surface 29 is brought to a common potential, the "record" or trace areas are also brought to this potential. Therefore, when flood beam 52 is flashed on, any lines of potential, or any traces, which have been placed on surface 29 by the main electron beam 27, are effectively removed, erased, or deleted from said surface, so that the same is made ready for a new recording; by this action, interference between the traces left over on the storage surface of storage tube 15 from the previous recording and comparing operations and the traces subsequently being recorded, is absolutely prevented.

The storage tube 14 contains a flood gun structure and arrangement exactly like the one for storage tube 15, and this structure functions similarly to delete the traces from the storage surface of tube 14 in response to the application of a positive gate pulse to the connection 61 which extends to the flood gun grid of tube 14.

By the connection of the flood gun gate generator 60 to gate generator 18, and by the operation of circuit 60, deleting or flood beams are flashed onto the two storage tube surfaces alternately, in synchronism with the gating circuit operations, in order to delete the trace patterns from the corresponding storage tube surfaces. These deleting operations take place during very short time intervals, the positive flood gun gate pulses being of relatively short duration. The connections of the flood gun gate generator 60 are so arranged that a deleting operation is provided for each storage tube immediately after that particular tube has undergone a comparing operation with channel B. With the position of the gating circuits illustrated, storage tube 15 is being compared by the signals received by channel B. When generator 18 operates the gating circuits at the end of this first period, generator 60 is triggered by generator 18 to apply a flood gun gate pulse to connection 59, to delete or wipe off the intelligence on the storage surface of storage tube 15.

During the second period, storage tube 14 is being compared by the signals received by channel B. When generator 18 operates the gating circuits at the end of this second period, generator 60 is triggered by generator 18 to apply a flood gun gate pulse to connection 61, to delete or wipe off the intelligence on the storage surface of storage tube 15.

During the third period, storage tube 15 is again being compared by the signals received by channel B. When generator 18 operates the gating circuits at the end of this third period, generator 60 is triggered by said generator to again apply a flood gun gate pulse to connection 59, to again wipe off the intelligence on the storage surface of storage tube 15.

The above procedure is repeated indefinitely, as long as the system is energized, with a deleting beam being flashed onto each storage tube surface in synchronism with the gates after each comparing cycle on that particular storage tube.

Fig. 2 is a time schedule, in tabular form, of the operation of the step and gate generator 18, the gating circuits 12, 13 and 42, and the flood gun gate generator 60. In this table, each vertical column, beginning with the second column, is intended to represent a particular interval of time, successive intervals being represented by successive columns from left to right. The separate items in each column are intended to indicate the operation taking place, at the particular instant represented by the corresponding column, in each of the system components on the corresponding horizontal level in the first vertical column. This explanation will become clearer as the description proceeds.

During operation No. 1, which is the first period referred to hereinabove and in which the gating circuits have the positions illustrated, channel A is writing on storage tube 14, channel B is comparing on storage tube 15, and the PPI oscilloscope gate is connected to storage tube 15, as previously explained.

At the end of the first period, a switch or gating operation of the gating circuits takes place, and during this operation a deleting or wipe off operation is provided on storage tube 15.

During operation No. 2, the second period, which follows the switching operation, channel B is comparing on storage tube 14, channel A is writing on storage tube 15, and the PPI oscilloscope gate is connected to storage tube 14.

At the end of the second period, a switch or gating operation of the gating circuits again takes place, and during this operation a deleting or wipe off operation is provided on storage tube 44.

During operation No. 3, the third period, which follows this second switching operation and in which the gating circuits again have the positions illustrated, channel A is again writing on storage tube 14, channel B is again comparing on storage tube 15, and the PPI oscilloscope gate is again connected to storage tube 15.

At the end of this third period, a switch or gating operation of the gating circuits again takes place, and during this operation a deleting or wipe off operation is again provided on storage tube 15.

It is believed that the schedule of Fig. 2, in connection with the above discussion, will make the operation of my system entirely clear. The system continues to scan at a rather high angular velocity, and continues to provide accurate indications of moving targets within the field of search, as long as the system is energized. Thus, an effective VLR MTI radar equipment utilizing two storage tubes has been devised.

Of course, it is to be understood that this invention is not limited to the particular details as described above, as many equivalents will suggest themselves to those skilled in the art. It is accordingly desired that the appended claims be given a broad interpretation commensurate with the scope of this invention within the art.

What is claimed is:

1. In a pulse-echo radar system: a pair of directional receiving antennas rotating at the same speed but with the center of the beam of one antenna trailing behind that of the other by a constant predetermined trailing angle, said antennas receiving echo pulses reflected from targets within the range of the system; a pair of electron discharge tubes, each tube including an electron gun for projecting a beam of electrons, a cooperating electrode having a potential storing surface on which said beam impinges, and deflecting means for deflecting said beam across said surface; and means for applying the echo pulses received by each of said antennas alternately to the deflecting means of the respective tubes during successive periods to thereby cause deflections of the corresponding electron beam in accordance with the echo pulses being received by the corresponding antenna, each of said antennas being connected to a different one of said tubes during the same period, the length of each period being equal to the time necessary for the antennas to rotate through said predetermined angle.

2. In a pulse-echo radar system: a pair of directional receiving antennas rotating at the same speed but with the center of the beam of one antenna trailing behind that of the other by a constant predetermined trailing angle, said antennas receiving echo pulses reflected from targets within the range of the system; a pair of electron discharge tubes, each tube including an electron gun for projecting a beam of electrons, a cooperating electrode having a potential storing surface on which said beam impinges, and deflecting means for deflecting said beam across said surface; and means for applying the echo pulses received by each of said antennas alternately to the deflecting means of the respective tubes during successive periods to thereby cause deflections of the corresponding electron beam in accordance with the echo pulses being received by the corresponding antenna, each of said antennas being connected to a different one of said tubes during the same period, the length of each period being equal to the time necessary for the antennas to rotate through said predetermined angle; the path of travel of each electron beam across its corresponding storage surface producing a line of discrete charges thereon, the potentials of which have a predetermined value; the pulses received by the leading antenna originally causing an electron beam to produce such a line of charges on each storage surface and the pulses received by the trailing antenna subsequently causing an electron beam to travel across the same storage surface to serve as a comparing beam for producing, in accordance with any deviations from said predetermined potential value along the subsequent path of travel, output signals indicative of such deviations.

3. In a pulse-echo radar system: a pair of directional receiving antennas rotating at the same speed but with the cener of he beam of one antenna trailing behind that of the other by a constant predetermined trailing angle, said antennas receiving echo pulses reflected from targets within the range of the system; a pair of electron discharge tubes, each tube including an electron gun for projecting a beam of electrons, a cooperating electrode having a potential storing surface on which said beam impinges, deflecting means for deflecting said beam across said surface, and an output electrode capacitively coupled to said surface; means for applying the echo pulses received by each of said antennas alternately to the deflecting means of the respective tubes during successive periods to thereby cause deflections of the corresponding electron beam in accordance with the echo pulses being received by the corresponding antenna, each of said antennas being connected to a different one of said tubes during the same period, the length of each period being equal to the time necessary for the antennas to rotate through said predetermined angle; and means for connecting the output electrodes of each of said tubes alternately to a common indicator during said successive periods, the particular tube so connected to said indicator during any period being the tube to which are applied during the same period the echo pulses received by the trailing antenna.

4. In a pulse-echo radar system: a pair of directional receiving antennas rotating at the same speed but with the center of the beam of one antenna trailing behind that of the other by a constant predetermined trailing angle, said antennas receiving echo pulses reflected from targets within the range of the system; a pair of electron discharge tubes, each tube including an electron gun for projecting a beam of electrons, an electrode having a potential storing surface on which said beam impinges, deflecting means for deflecting said beam across said surface, and an output electrode capacitively coupled to said surface; means for applying the echo pulses received by each of said antennas alternately to the deflecting means of the respective tubes during successive periods to thereby cause deflections of the corresponding electron beam in accordance with the echo pulses being received by the corresponding antenna, each of said antennas being connected to a different one of said tubes during the same period, the length of each period being equal to the time necessary for the antennas to rotate during said predetermined angle; the path of travel of each electron beam across its corresponding storage surface producing a line of discrete charges thereon, the potentials of which have a predetermined value; the pulses received by the leading antenna originally causing an electron beam to produce such a line of charges on each storage surface and the pulses received by the trailing antenna subsequently causing an electron beam to travel across the same storage surface to serve as a comparing beam for producing, in accordance with any deviations from said predetermined potential value along the subsequent path of travel, output signals on said output electrode indicative of such deviations; and means for connecting the output electrodes of each of said tubes alternately to a common indicator during said successive periods, the particular tube so connected to said indicator during any period being the tube to which are applied during the same period the echo pulses received by the trailing antenna.

5. In a pulse-echo radar system: a pair of directional receiving antennas rotating at the same speed but with the center of the beam of one antenna trailing behind that of the other by a constant predetermined trailing angle, said antennas receiving echo pulses reflected from targets within the range of the system; a pair of electron discharge tubes, each tube including an electron gun for projecting a beam of electrons, a cooperating electrode having a potential storing surface on which said beam impinges, and deflecting means for deflecting said beam across said surface; means for applying the echo pulses received by each of said antennas alternately to the deflecting means of the respective tubes during successive periods to thereby cause deflections of the corresponding electron beam in accordance with the echo pulses being received by the corresponding antenna, each of said antennas being connected to a different one of said tubes during the same period, the length of each period being equal to the time necessary for the antennas to rotate through said predetermined angle; the path of travel of each electron beam across its corresponding storage surface producing a line of discrete charges thereon, the potentials of which have a predetermined value; the pulses received by the leading antenna originally causing an electron beam to produce such a line of charges on each storage surface and the pulses received by the trailing antenna subsequently causing an electron beam to travel across the same storage surface to serve as a comparing beam for producing, in accordance with any deviations from said predetermined potential value along the subsequent path of travel, output signals indicative of such deviations; and means, including a source of electrons in each of said tubes, for deleting the line of charges from the storage surface thereof after said comparing beam has traveled thereacross.

6. In a pulse-echo radar system: a pair of directional receiving antennas rotating at the same speed but with the center of the beam of one antenna trailing behind that of the other by a constant predetermined trailing angle, said antennas receiving echo pulses reflected from targets within the range of the system; a pair of electron discharge tubes, each tube including an electron gun for projecting a beam of electrons, a cooperating electrode having a potential storing surface on which said beam impinges, deflecting means for deflecting said beam across said surface, and an output electrode capacitively coupled to said surface; means for applying the echo pulses received by each of said antennas alternately to the deflecting means of the respective tubes during successive periods to thereby cause deflections of the corresponding electron beam in accordance with the echo pulses being received by the corresponding antenna, each of said antennas being connected to a different one of said tubes during the same period, the length of each period being equal to the time necessary for the antennas to rotate through said predetermined angle; the path of travel of each electron beam across its corresponding storage surface producing a line of discrete charges thereon, the potentials of which have a predetermined value; the pulses received by the leading antenna originally causing an electron beam to produce such a line of charges on each storage surface and the pulses received by the trailing antenna subsequently causing an electron beam to travel across the same storage surface to serve as a comparing beam for producing, in accordance with any deviations from said predetermined potential value along the subsequent path of travel, output signals on said output electrode indicative of such deviations; means for connecting the output electrodes of each of said tubes alternately to a common indicator during said successive periods, the particular tube so connected to said indicator during any period being the tube to which are applied during the same period the echo pulses received by the trailing antenna; and means, including a source of electrons in each of said tubes, for deleting the line of charges from the storage surface thereof after said comparing beam has traveled thereacross.

7. In a pulse-echo radar system: a pair of directional receiving antennas having identical directional response characteristics and rotating at the same speed but with the center of the beam of one antenna trailing behind that of the other by a constant predetermined trailing angle, said antennas receiving echo pulses reflected from targets within the range of the system; a pair of electron discharge tubes, each tube including an electron gun for projecting a beam of electrons, a cooperating electrode having a potential storing surface on which said beam impinges, and deflecting means for deflecting said beam across said surface; and means for applying the echo pulses received by each of said antennas alternately to the deflecting means of the respective tubes during successive periods to thereby cause deflections of the corresponding electron beam in accordance with the echo pulses being received by the corresponding antenna, each of said antennas being connected to a different one of said tubes during the same period, the length of each period being equal to the time necessary for the antenna to rotate through said predetermined angle.

8. In a pulse-echo radar system: a pair of directional receiving antennas having identical directional response characteristics and rotating at the same speed but with the center of the beam of one antenna trailing behind that of the other by a constant predetermined trailing angle, said antennas receiving echo pulses reflected from targets within the range of the system; a pair of electron discharge tubes, each tube including an electron gun for projecting a beam of electrons, a cooperating electrode having a potential storing surface on which said beam impinges, deflecting means for deflecting said beam across said surface, and an output electrode capacitively coupled to said surface; means for applying the echo pulses received by each of said antennas alternately to the deflecting means of the respective tubes during successive periods to thereby cause deflections of the corresponding electron beam in accordance with the echo pulses being received by the corresponding antenna, each of said antennas being connected to a different one of said tubes during the same period, the length of each period being equal to the time necessary for the antennas to rotate through said predetermined angle; and means for connecting the output electrodes of each of said tubes alternately to a common indicator during said successive periods, the particular tube so connected to said indicator during any period being the tube to which are applied during the same period the echo pulses received by the trailing antenna.

9. In a pulse-echo radar system: a pair of directional receiving antennas having identical directional response characteristics and rotating at the same speed but with the center of the beam of one antenna trailing behind that of the other by a constant predetermined trailing angle, said antennas receiving echo pulses reflected from targets within the range of the system; a pair of electron discharge tubes, each tube including an electron gun for projecting a beam of electrons, a cooperating electrode having a potential storing surface on which said beam impinges, and deflecting means for deflecting said beam across said surface; and means for applying the echo pulses received by each of said antennas alternately to the deflecting means of the respective tubes during successive periods to thereby cause deflections of the corresponding electron beam in accordance with the echo pulses being received by the corresponding antenna, each of said antennas being connected to a different one of said tubes during the same period, the length of each period being equal to the time necessary for the antennas to rotate through said predetermined angle; the path of travel of each electron beam across its corresponding storage surface producing a line of discrete charges thereon, the potentials of which have a predetermined value; the pulses received by the leading antenna originally causing an electron beam to produce such a line of charges on each storage surface and the pulses received by the trailing antenna subsequently causing an electron beam to travel across the same storage surface to serve as a comparing beam for producing, in accordance with any deviations from said predetermined potential value along the subsequent path of travel, output signals indicative of such deviations.

10. In a pulse-echo radar system: a pair of directional receiving antennas having identical directional response characteristics and rotating at the same speed but with the center of the beam of one antenna trailing behind that of the other by a constant predetermined trailing angle, said antennas receiving echo pulses reflected from targets within the range of the system; a pair of exactly similar amplifying and detecting channels, one of which is connected to receive the pulses received by each of said antennas; a pair of electron discharge tubes, each tube including an electron gun for projecting a beam of electrons, a cooperating electrode having a potential storing surface on which said beam impinges, and deflecting means for deflecting said beam across said surface; and means for applying the outputs of each of said channels alternately to the deflecting means of the respective tubes during successive periods to thereby cause deflections of the corresponding electron beam in accordance with the output of the corresponding channel, each of said channels being connected to a different one of said tubes during the same period, the length of each period being equal to the time necessary for the antennas to rotate through said predetermined angle.

11. In a pulse-echo radar system: a pair of directional receiving antennas having identical directional response characteristics and rotating at the same speed but with the center of the beam of one antenna trailing behind that of the other by a constant predetermined trailing angle, said antennas receiving echo pulses reflected from targets within the range of the system; a pair of exactly similar amplifying and detecting channels, one of which is connected to receive the pulses received by each of said antennas; a pair of electron discharge tubes, each tube including an electron gun for projecting a beam of electrons, a cooperating electrode having a potential storing surface on which said beam impinges, deflecting means for deflecting said beam across said surface, and an output electrode capacitively coupled to said surface; means for applying the outputs of each of said channels alternately to the deflecting means of the respective tubes during successive periods to thereby cause deflections of the corresponding electron beam in accordance with the output of the corresponding channel, each of said channels being connected to a different one of said tubes during the same period, the length of each period being equal to the time necessary for the antennas to rotate through said predetermined angle; and means for connecting the output electrodes of each of said tubes alternately to a common indicator during said successive periods, the particular tube so connected to said indicator during any period being the tube to which is applied during the same period to the output of the trailing antenna channel.

12. In a pulse-echo radar system: a pair of directional receiving antennas having identical directional response characteristics and rotating at the same speed but with the center of the beam of one antenna trailing behind that of the other by a constant predetermined trailing angle, said antennas receiving echo pulses reflected from targets within the range of the system; a pair of exactly similar amplifying and detecting channels, one of which is connected to received the pulses received by each of said antennas; a pair of electron discharge tubes, each tube including an electron gun for projecting a beam of electrons, a cooperating electrode having a potential storing surface on which said beam impinges, and deflecting means for deflecting said beam across said surface; and means for applying the outputs of each of said channels alternately to the deflecting means of the respective tubes during successive periods to thereby cause deflections of the corresponding electron beam in accordance with the output of the corresponding channel, each of said channels being connected to a different one of said tubes during the same period, the length of each period being equal to the time necessary for the antennas to rotate through said predetermined angle; the path of travel of each electron beam across its corresponding storage surface producing a line of discrete charges thereon, the potentials of which have a predetermined value; the output of the leading antenna channel originally causing an electron beam to produce such a line of charges on each storage surface and the output of the trailing antenna channel subsequently causing an electron beam to travel across the same storage surface to serve as a comparing beam for producing, in accordance with any deviations from said predetermined potential value along the subsequent path of travel, output signals indicative of such deviations.

13. In a pulse-echo radar system: a pair of directional receiving antennas having identical directional response characteristics and rotating at the same speed but with the center of the beam of one antenna trailing behind that of the other by a constant predetermined trailing angle, said antennas receiving echo pulses reflected from targets within the range of the system; a pair of exactly similar amplifying and detecting channels, one of which is connected to receive the pulses received by each of said antennas; a pair of electron discharge tubes, each tube including an electron gun for projecting a beam of electrons, a cooperating electrode having a potential storing surface on which said beam impinges, deflecting means for deflecting said beam across said surface, and an output electrode capacitively coupled to said surface; means for applying the outputs of each of said channels alternately to the deflecting means of the respective tubes during successive periods to thereby cause deflections of the corresponding electron beam in accordance with the output of the corresponding channel, each of said channels being connected to a different one of said tubes during the same period, the length of each period being equal to the time necessary for the antennas to rotate through said predetermined angle; the path of travel of each electron beam across its corresponding storage surface producing a line of discrete charges thereon, the potentials of which have a predetermined value; the output of the leading antenna channel originally causing an electron beam to produce such a line of charges on each storage surface and the output of the trailing antenna channel subsequently causing an electron beam to travel across the same storage surface to serve as a comparing beam for producing, in accordance with any deviations from said predetermined potential value along the subsequent path of travel, output signals on said output electrode indicative of such deviations; and means for connecting the output electrodes of each of said tubes alternately to a common indicator during said successive periods, the particular tube so connected to said indicator during any period being the tube to which is applied during the same period the output of the trailing antenna channel.

14. In a pulse-echo radar system: a pair of directional receiving antennas rotating at the same speed but with the center of the beam of one antenna trailing behind that of the other by a constant predetermined trailing angle, said antennas receiving echo pulses reflected from targets within the range of the system; a pair of electron discharge tubes, each tube including an electron gun for projecting a beam of electrons, a cooperating electrode having a potential storing surface on which said beam impinges, and deflecting means for deflecting said beam across said surface; a pair of operable gating circuits for applying the echo pulses received by each of said antennas alternately to the deflecting means of the respective tubes during successive periods to thereby cause deflections of the corresponding electron beam in accordance with the echo pulses being received by the corresponding antenna, each of said antennas being connected to a different one of said tubes during the same period, the length of each period being equal to the time necessary for the antennas to rotate through said predetermined angle; and means for operating said gating circuits in synchronism to end each such period and begin the following period.

15. In a pulse-echo radar system: a pair of directional receiving antennas rotating at the same speed but with the center of the beam of one antenna trailing behind that of the other by a constant predetermined trailing angle, said antennas receiving echo pulses reflected from targets within the range of the system; a pair of electron discharge tubes, each tube including an electron gun for projecting a beam of electrons, a cooperating electrode having a potential storing surface on which said beam impinges, deflecting means for deflecting said beam across said surface, and an output electrode capacitively coupled to said surface; a pair of operable gating circuits for applying the echo pulses received by each of said antennas alternately to the deflecting means of the respective tubes during successive periods to thereby cause deflections of the corresponding electron beam in accordance with the echo pulses being received by the corresponding antenna, each of said antennas being connected to a different one of said tubes during the same period and the length of each period being equal to the time necessary for the antennas to rotate through said predetermined angle; an operable gating circuit for connecting the output electrodes of each of said tubes alternately to a common indicator during said successive periods, the particular tube so connected to said indicator during any period being the tube to which are applied during the same period the echo pulses received by the trailing antenna; and means for operating all of said gating circuits in synchronism to end each such period and begin the following period.

16. In a pulse-echo radar system: a source of repetitive pulses; a pair of directional receiving antennas rotating at the same speed but with the center of the beam of one antenna trailing behind that of the other by a constant predetermined trailing angle, said antennas receiving echo pulses reflected from targets within the range of the system; the repetition rate of said source being so correlated with the speed of rotation of said antennas and with said angle that the time required for said antennas to rotate through said angle is equal to a predetermined integral multiple of the inverse repetition rate of said source; a pair of electron discharge tubes, each tube including an electron gun for projecting a beam of electrons, a cooperating electrode having a potential storing surface on which said beam impinges, deflecting means, triggered by said source, for repetitively causing sweeps of said beam in one direction across said surface to occur in synchronism with the pulses of said source, and deflecting means for deflecting said beam in a direction transverse to said one direction; and means for applying the echo pulses received by each of said antennas alternately to the last-named deflecting means of the respective tubes during successive periods to thereby cause deflections of the corresponding electron beam in accordance with the echo pulses being received by the corresponding antenna, each of said antennas being connected to a different one of said tubes during the same period; said last-named means being controllable by said source and effective in response to said predetermined integral multiple of pulses of said source to end each period and begin the following period.

17. In a pulse-echo radar system: a source of repetitive pulses; a pair of directional receiving antennas rotating at the same speed but with the center of the beam of one antenna trailing behind that of the other by a constant predetermining trailing angle, said antennas receiving echo pulses reflected from targets within the range of the system; the repetition rate of said source being so correlated with the speed of rotation of said antennas and with said angle that the time required for said antennas to rotate through said angle is equal to a predetermined integral multiple of the inverse repetition rate of said source; a pair of electron discharge tubes, each tube including an electron gun for projecting a beam of electrons, a cooperating electrode having a potential storing surface on which said beam impinges, deflecting means, triggered by said source, for repetitively causing sweeps of said beam in one direction across said surface to occur in synchronism with the pulses of said source, and deflecting means for deflecting said beam in a direction transverse to said one direction; and means for applying the echo pulses received by each of said antennas alternately to the last-named deflecting means of the respective tubes during successive periods to thereby cause deflections of the corresponding electron beam in accordance with the echo pulses being received by the corresponding antenna, each of said antennas being connected to a different one of said tubes during the same period; said last-named means being controllable by said source and effective in response to said predetermined integral multiple of pulses of said source to end each period and begin the following period; each resultant path of travel of each electron beam across its corresponding storage surface producing a line of discrete charges thereon, the potentials of which have a predetermined value; the pulses received by the leading antenna originally causing an electron beam to produce a number of lines of charges on each storage surface equal to said predetermined multiple and the pulses received by the trailing antenna subsequently causing an electron beam to travel across the same number of lines on the same storage surface to serve as a comparing beam for producing, in accordance with any deviations from said predetermined potential value along the subsequent path of travel, output signals indicative of such deviations.

18. In a pulse-echo radar system: a source of repetitive pulses; a pair of directional receiving antennas rotating at the same speed but with the center of the beam of one antenna trailing behind that of the other by a constant predetermined trailing angle, said antennas receiving echo pulses reflected from targets within the range of the system; the repetition rate of said source being so correlated with the speed of rotation of said antennas and with said angles that the time required for said antennas to rotate through said angle is equal to a predetermined integral multiple of the inverse repetition rate of said source; a pair of electron discharge tubes, each tube including an electron gun for projecting a beam of electrons, a cooperating electrode having a potential storing surface on which said beam impinges, deflecting means, triggered by said source, for repetitively causing sweeps of said beam in one direction across said surface to occur in synchronism with the pulses of said source, deflecting means for deflecting said beam in a direction transverse to said one direction, and an output electrode capacitively coupled to said surface; means for applying the echo pulses received by each of said antennas alternately to the last-named deflecting means of the respective tubes during successive periods to thereby cause deflections of the corresponding electron beam in accordance with the echo pulses being received by the corresponding antenna, each of said antennas being connected to a different one of said tubes during the same period; said last-named means being controllable by said source and effective in response to said predetermined integral multiple of pulses of said source to end each period and begin the following period; and means controlled by said source and operated synchronously with said controllable means for connecting the output electrodes of each of said tubes alternately to a common indicator during said successive periods, the particular tube so connected to said indicator during any period being the tube to which are applied during the same period the echo pulses received by the trailing antenna.

19. In a pulse-echo radar system: a source of repetitive pulses; a pair of directional receiving antennas rotating at the same speed but with the center of the beam of one antenna trailing behind that of the other by a constant predetermined trailing angle, said antennas receiving echo pulses reflected from targets within the range of the system; the repetition rate of said source being so correlated with the speed of rotation of said antennas and with said angle that the time required for said antennas to rotate through said angle is equal to a predetermined integral multiple of the inverse repetition rate of said source; a pair of electron discharge tubes, each tube including an electron gun for projecting a beam of electrons, a cooperating electrode having a potential storing surface on which said beam impinges, deflecting means, triggered by said source, for repetitively causing sweeps of said beam in one direction across said surface to occur in synchronism with the pulses of said source, deflecting means for deflecting said beam in a direction transverse to said one direction, and an output electrode capacitively coupled to said surface; a pair of operable gating circuits for applying the echo pulses received by each of said antennas alternately to the last-named deflecting means of the respective tubes during successive periods to thereby cause deflections of the corresponding electron beam in accordance with the echo pulses being received by the corresponding antenna, each of said antennas being connected to a different one of said tubes during the same period; an operable gating circuit for connecting the output electrodes of each of said tubes alternately to a common indicator during successive periods, the particular tube so connected to said indicator during any period being the tube to which are applied during the same period the echo pulses received by the trailing antenna; and means controlled by said source and effective in response to said predetermined integral multiple of pulses of said source for operating all of said gating circuits in synchronism to end each such period and begin the following period.

20. In combination, first means for radiating time-spaced pulses of high frequency energy and for receiving reflections of said radiated energy from target objects, said first means including a first directional radiating and receiving antenna controllable to effect rotation of its directional axis about a predetermined axis of rotation, second means for radiating time-spaced pulses of high frequency energy and for receiving reflections of said radiated energy from target objects, said second means including a second directional radiating and receiving antenna also controllable to effect rotation of its directional axis about said predetermined axis of rotation, means for controlling said first and second means to cause each of them to radiate a series of pulses of energy, means for further controlling said first and second means simultaneously to effect rotation of the directional axes of said antennae about said predetermined axis of rotation, means for maintaining the angular spacing between the directional axes of said antennae, measured about said axis of rotation, substantially equal to the angle through which said directional axes rotate during the interval between the radiation of each pulse from said first means and the radiation of a later pulse from said second means, and means supplied with the reflections received by both said first and second means for comparing the reflections received by one of said means from a given target object with the reflection received by the other of said means from the same target object and for producing indications of differences between said reflections.

References Cited in the file of this patent

UNITED STATES PATENTS

| | | |
|---|---|---|
| 2,403,562 | Smith | July 9, 1946 |
| 2,412,669 | Bedford | Dec. 17, 1946 |
| 2,419,239 | White | Apr. 22, 1947 |
| 2,445,213 | Evans | July 13, 1948 |

UNITED STATES PATENT OFFICE
CERTIFICATE OF CORRECTION

Patent No. 2,974,317  March 7, 1961

Hans Klemperer

It is hereby certified that error appears in the above numbered patent requiring correction and that the said Letters Patent should read as corrected below.

Column 4, line 47, for "circiuts" read -- circuits --; column 5, line 61, for "therein" read -- thereon --; line 62, after "control" insert -- electrodes --; column 6, line 13, for "connected 36" read -- connection 36 --; column 14, line 9, for "44" read -- 14 --; column 15, line 13, for "cener of he" read -- center of the --; column 16, line 39, for "angle," read -- angle; --.

Signed and sealed this 3rd day of October 1961.

(SEAL)
Attest:

ERNEST W. SWIDER
Attesting Officer

DAVID L. LADD
Commissioner of Patents
USCOMM-DC